United States Patent

Andermo

[15] 3,689,157
[45] Sept. 5, 1972

[54] DEVICE FOR MEASURING THE RELATIVE MOVEMENT BETWEEN AN OBJECT AND THE ENVIRONMENT OF THE OBJECT

[72] Inventor: Ingvar Andermo, Taby, Sweden

[73] Assignee: Institutet For Mikrovagsteknik, Stockholm, Sweden

[22] Filed: Nov. 26, 1969

[21] Appl. No.: 880,293

[30] Foreign Application Priority Data

Dec. 10, 1968 Sweden ................... 16843/68

[52] U.S. Cl. ..................... 356/28, 324/175, 324/178
[51] Int. Cl. .............................................. G01p 3/36
[58] Field of Search ................. 356/28; 324/178, 175

[56] References Cited

UNITED STATES PATENTS

| | | | |
|---|---|---|---|
| 3,508,066 | 4/1970 | Agar | 356/28 |
| 3,413,850 | 12/1968 | Merrifield | 356/28 |
| 3,227,888 | 1/1966 | Shepherd et al. | 356/28 |
| 2,967,449 | 1/1961 | Weiss | 356/28 |

Primary Examiner—Benjamin A. Borchelt
Assistant Examiner—S. C. Buczinski
Attorney—Hane & Baxley

[57] ABSTRACT

A device for measuring the relative movement between an object and the environment of the object comprises a signal source, two scanning devices, arranged to generate two signals derived from a signal from the signal source, a delay device and a comparison circuit connected to the two scanning devices, one through the delay device on the input side and to a control circuit on the output side. The control circuit is arranged to control some part of the device with a control signal so that the two signals tend to coincide. Further the device has a correction circuit, the input side of which is connected to speed sensing means, which is independent of the control circuit, and the output side of which is connected to the control circuit. The correction circuit is arranged to influence the control circuit so that the control signal, at least at velocities near zero, has a limited variation range around a value corresponding to the speed indicated by the independent speed sensing means.

5 Claims, 4 Drawing Figures

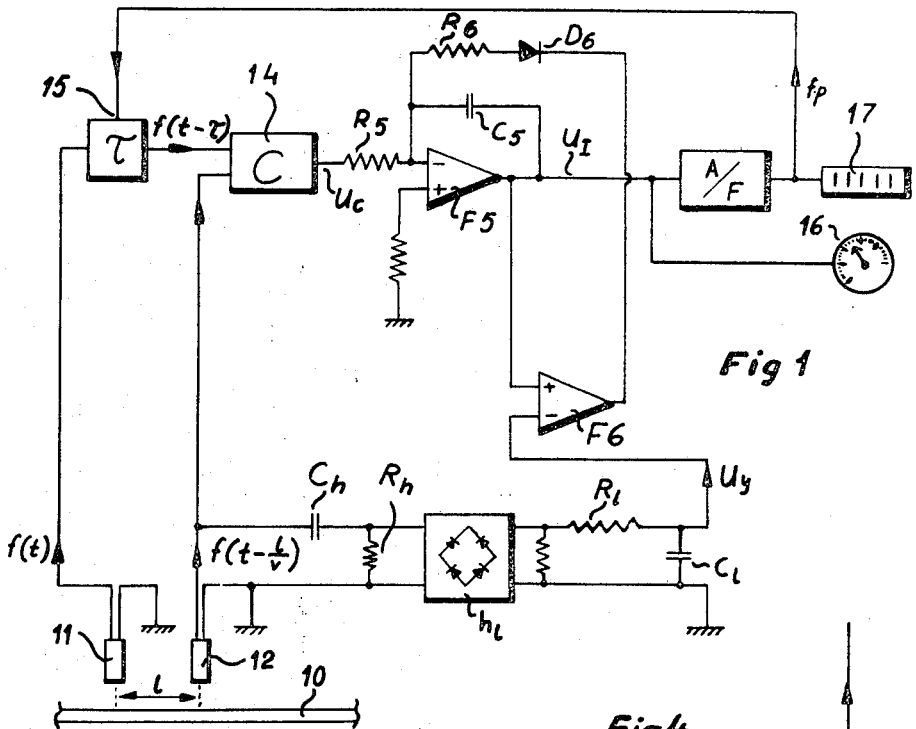
Fig 1
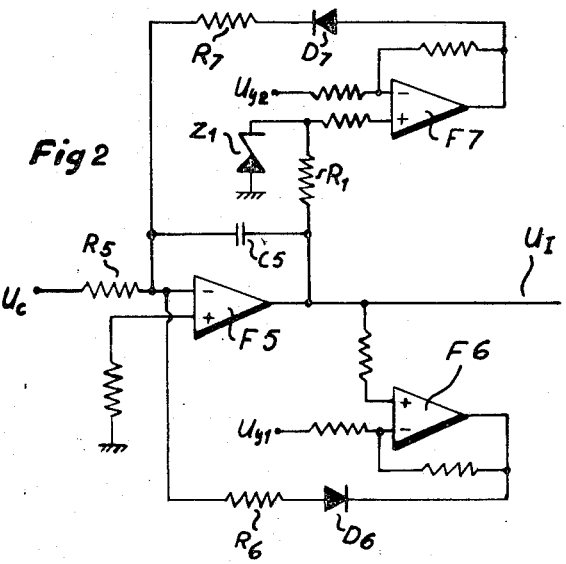
Fig 2
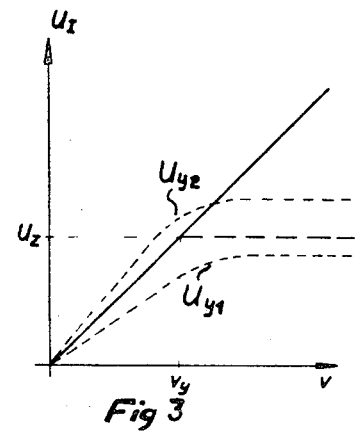
Fig 4
Fig 3
INVENTOR
INGVAR ANDERMO
BY Hane and Baxley
ATTORNEYS

DEVICE FOR MEASURING THE RELATIVE MOVEMENT BETWEEN AN OBJECT AND THE ENVIRONMENT OF THE OBJECT

The present invention concerns a device for measuring the relative movement between an object and the environment of the object. More particularly, the invention concerns a device comprising a signal source, two scanning devices, a comparing circuit, a delay device and a control circuit, whereby the scanning devices are arranged to generate two similar signals which, depending on the distance between the scanning devices in the direction of motion are displaced in time and originate from the signal source with a noise character. The comparing circuit is arranged for comparing the generated signals. The delay device is arranged for time delaying one of the said signals. The control circuit is arranged to control some of the elements of the measuring device so as to constrain the signals of the two inputs of the comparing circuit toward equality.

It has been shown that such a device requires special means so as to work entirely satisfactorily at low speeds. The signals from the scanning devices have a frequency spectrum, which, because the signals originate from a spatial variability of the signal source, is proportioned to the relative speed between the object and its environment. At speeds near zero the signals will therefore contain low frequency-components. If low-pass filters associated with comparing circuit have too high a frequency response (small time-constant) the time-constant)the low-frequency components of the signals will directly influence the control signal and the measurement might thereby be disturbed so much that the control signal during brief moments will stray too far from the correct value so that the comparing circuit loses its ability to determine if the control signal indicates too low or too high a speed. The control signal thus becomes erratic. Lowering the frequency response (increasing the time-constant) might on the other hand cause the system to respond too slowly to cope with actual speed changes. The object of the present invention is to eliminate said drawbacks.

The characteristics of the invention are evident from accompanied patent claims.

The invention will be more precisely described in connection to accompanying drawing, where FIG. 1 schematically shows a device according to the invention.

FIG. 2 shows a modification of a part of the device according to FIG. 1.

FIG. 3 shows a voltage-speed diagram for the modification according to FIG. 2, and FIG. 4 shows another modification of a part of the device according to FIG. 1.

The device according to FIG. 1 is intended as a velocity measuring device for railway trains, i.e. the device is located in the engine and measures the velocity $v$ relative the rails 10. The device can work with light sources which are attached to the train near one of the rails and reflected therefrom. The device located on the engine comprises two scanning devices 11 and 12, a comparing circuit 14, a delay device $\tau$, a control circuit F5-A/F, an indicating means 16 for indicating the velocity of the train $v$ and an indicating means for indicating the distance $S = \int v dt$ covered by the train.

The scanning devices 11 and 12 are arranged at a determined mutual distance $l$ in the direction of movement (longitudinal) of the train, and are devised to generate, without mechanical contact near one of the rails, two similar signals, $f(t)$ and $f(t - l/v)$ of a noise character. However, the signals are displaced by a factor which depends on the distance $l$ between the devices and the velocity $v$ of the train. The signals are therefore a function of distance (the extension of the rail), and thus a function of time when the train moves relative the rails.

In the comparing circuit 14 a comparison between the said two signals takes place. The comparing circuit has one input connected to the scanning device 11, via the delay device $\tau$, the other input connected to the scanning device 12, and its output connected to the controlling circuit F5-A/F.

The controlling circuit F5-A/F comprises an integrating circuit $R_5$ - $C_5$ - F5 comprising a resistor R5, connected to the output of the comparing circuit 14, and a capacitor $C_5$, connected between the output of a subtracting circuit F5 and one (negative) input, to which the resistor $R_5$ is also connected. When correctly measuring the train speed $v$ the output voltage $U_I$ of the integrating circuit is proportional to the speed $v$. The control circuit also comprises an analogue-to-frequency converter A/F which is connected to the output of the integrating circuit and converts the output voltage $U_I$ to a frequency signal $fp$, whose frequency is a measure of the train velocity $v$.

The delay device $\tau$ has a control input 15 to which the frequency signal $fp$ is distributed as a control signal for varying of the delay $\tau$ so as to bias the signals at the inputs of the comparing circuit 14 toward equality.

The indicating means 16 is connected to the junction of the integrating circuit $R_5$ - $C_5$ - F5 and the analogue-frequency converter A/F and the indicating means 17 is connected to the output of the converter A/F.

The device according to FIG. 1 comprises furthermore a correcting circuit F6 - $D_6$ - $R_6$, which consists of a subtracting circuit F6, a diode $D_6$ and a resistor $R_6$. The one input (+) of the subtraction circuit F6 is connected to the output of the subtracting circuit F5. The other input (−) is connected to an independent speed sensing means 12 - $C_h$ - $R_h$ - $h_1$ - $R_1$ - $C_1$ and its output is connected to the negative input of the subtracting circuit F5 via the diode $D_6$ and the resistor $R_6$. There is thus fed to the subtracting circuit F6, partly, the earlier mentioned voltage $U_I$ and partly a voltage $U_y$ from the independent speed sensing means. The polarity of the inputs of the circuit F6 and the conducting direction of the diode $D_6$ are chosen such that any tendency of the voltage $U_I$ to fall below the voltage $U_y$ causes the voltage of the output of the circuit F6 to acquire such a polarity to open the diode D6 and the integrating circuit to receive an input current via the resistor $R_6$ with such a polarity that the voltage $U_I$ rises. This will mean that the voltage $U_I$ cannot fall below the voltage $U_y$ which is received from the control signal independent speed sensing means that generates an output voltage proportional to the speed, at least within the limited speed range when the proper functioning of the basic device is unsafe. The proportionality factor (voltage/speed) for the voltage $U_y$ is a little less than the corresponding factor for the voltage $U_I$. When there is a correct value of the voltage $U_I$ in relation to real speed, the correction circuit will not influence the measurement.

The control signal independent speed sensing means according to FIG. 1 consists of a combination of the scanning device 12, a high-pass filter ($C_h$ - $R_h$) of the simple R-C link kind, a full-wave rectifier $h_1$ and a low-pass filter $R_1$ - $C_1$. The signal from the scanning device 12 originates from the reflectivity of the surface of the rail. If the reflecting surface structure of the rail is entirely randomly distributed along the length of the rail, the signal has a frequency spectrum that is to a limit determined by the properties of the optics of the scanning device and of speed. The speed dependency implies that the extension of the frequency upwards is proportional to the speed. The high-pass filter $C_h$ - $R_h$ has a transfer function which makes the output amplitude at constant input-amplitude of the input signal, proportionate to the frequency up to a frequency limit $f_o$, above which it will be approximately constant. Accordingly the mean amplitude at the output side of the high-pass filter $C_h$ - $R_h$ will be approximately proportionate to the speed as long as the speed will be so low that no frequency component of the signal will exceed the frequency limit $f_o$. At higher speeds said mean amplitude will approache a constant value. The full wave rectifier $h_1$ and the low-pass filter $R_1$ - $C_1$ serves to generate the voltage $U_v$ so as to make it proportional to the mean amplitude of the output signal of the high-pass filter $C_h$ - $R_h$, whereby the voltage $U_v$ thus will become proportional to the speed $v$ for at least relatively low speeds.

Reversing the diode D6 in FIG. 1 will give the result that the voltage $U_1$ will become limited upwards by the voltage $U_v$ at the negative input of the subtracting circuit F6. Operation of such a circuit except for polarity reversal is the same as that described in the preceding passage.

FIG. 2 shows how a circuit F7 - $D_7$ - $R_7$ for upper limiting the output voltage $U_I$ of the integrating circuit combines with the circuit F6 - $D_6$ - $R_6$ for lower limiting the voltage $U_I$. A limiting voltage $U_{v2}$ fed to the subtracting circuit F7 of the circuit F7 - $D_7$ - $R_7$ should always be higher than the corresponding limiting voltage $U_{v1}$ fed to the subtracting circuit F6. With both voltages derived from the governing signal independent speed sensing means, $U_{v2} = k_2 \cdot U_v$ and $U_{v1} = k_1 \cdot U_v$ whereby $k_2 > 1$, and $k_1 < 1$ and $U_v$ is the output voltage from the control signal independent speed sensing means which here, at low speed, should have about the same constant of proportion concerning the speed $v$ as the output voltage of the integrating circuit $U_I$.

From the preceding discussion, it will be apparent that the output voltage of the integrating circuit $U_1$ is constrained to lie between voltages $U_{v2}$ and $U_{v1}$. However, when the velocity being sensed results in the generation of signals having frequency components exceeding the limiting frequency of the high-pass filter, the voltage $U_I$ might become "depressed" by the upper limiting voltage $U_{v2}$ below the correct value. In the device according to FIG. 2 this will be prevented by a voltage limiting circuit $R_1$ - $Z_1$ consisting of a resistor $R_1$ and a Zener diode Z1 connected to ground in the connection between the output of the integrating circuit and the positive input of the subtracting circuit F7. The circuit $R_1$ - $Z_1$ will prevent an increase of the voltage $U_I$ beyond the rated voltage of the Zener diode to transfer to the circuit F7, and the integrating circuit will remain unaffected by the correcting circuit F7 - $D_7$ - $R_7$ even when its second voltage $U_{v2}$, at higher speeds, approaches a constant value.

FIG. 3 shows how the output voltage of the integrating circuit $U_I$ will be bracketed between the voltages $U_{v2}$ and $U_{v1}$ at low speeds, whereby the speed can be measured right down until the train is not moving. At high speeds the distance between correct integrating circuit voltage $U_1$ and upper limiting voltage $U_{v2}$ and lower limiting voltage $U_{v1}$ will increase and the measurement now will take place without influence from the correcting circuit.

FIG. 4 shows another way of limiting the control frequency $f_p$ to a limit around a value determined from the governing signal independent speed sensing means. The voltage $U_v$ from the said means is in this case proportional to the speed over the entire measuring range, and it will be fed to the junction between the integrating circuit F5 - $C_5$ - $R_5$ and the analogue-to-frequency converter A/F in such a way as to be added to the integrating voltage $U_I$. This takes place by an adding circuit $R_8$ - $R_9$, having a resistor $R_8$ between the subtracting circuit F5 and the analogue-to-frequency converter A/F and a resistor $R_9$ between the said means and the analogue to frequency converter A/F. By limiting the integrating circuit output voltage $U_I$ to a certain portion of $U_v$, for instance $U_I = +0.1 \cdot U_v$ or $U_I = -0.1 \cdot U_v$, the governing signal will become coarsely adjusted by the voltage $U_v$ from the independent speed sensing means and finely adjusted by the output voltage $U_I$ of the integrating circuit.

The invention is of course not restricted to the described devices. Thus, for instance, the scanning means may be constituted of magnetic sensing means with a constant resolution in the direction of movement. The contained spectrum will still become proportional to the speed by suitable arrangement of necessary electronic parts. The input of the governing signal independent speed sensing means may constitute an entirely independent meter, for instance means connected to the wheels of the train, giving a voltage proportional to the speed.

What is claimed is:

1. A device for measuring the relative movement of an object with respect to its environment comprising a signal source for generating a primary signal, two scanning devices, displaced from each other by a predetermined distance along the direction of motion of the object, for generating two similar signals derived from said primary signal, said two similar signals being time displaced as a function of the displacement between said scanning devices and the relative velocity of the movement, a two-input comparison circuit having an output for generating a signal related to the difference in the signals received at the two inputs, means for connecting one of said scanning devices to one of the inputs of said comparison circuits, delay means for connecting the other of said scanning devices to the other input of said comparison circuit, velocity indicating means connected to the output of said comparison circuit, control means having an input connected to the output of said comparison circuit and having an output for transmitting a control signal to said delay means for constraining the signals received at the inputs of said comparison circuit toward equality, an independent speed sensing means and an output connected to said control means for limiting the value of the control signal transmitted by said control means to a limited range of values about a value related to a speed sensed by said independent speed sensing means.

2. A device according to claim 1 wherein said independent speed sensing means includes said one of said scanning devices, and a frequency analyzing means connected in series therewith for transmitting a signal which is proportional to the frequency of the signals from said one scanning device at least for frequencies less than a predetermined frequency.

3. A device according to claim 1 wherein said control means comprises an integrating circuit and said correction means comprises a two-input signal subtracting circuit, one of the inputs being connected to the output of said integrating circuit, the other of the inputs being connected to said independent speed sensing means, and a unidirection signal conducting device connecting the output of said signal subtraction circuit to the input of said integrating circuit.

4. A device according to claim 3 wherein a voltage-limiting circuit connects the output of said integrating circuit to said one input of said signal subtraction circuit.

5. A device according to claim 1 wherein said control means comprises an integrating circuit having an input for receiving signals from said comparison circuit and an output, a two-input signal adder circuit having an input connected to the output of said integrating circuit, a second input connected to said independent speed sensing means and an output, and an analog-to-frequency converter having an input connected to the output of said signal adder circuit and an output for transmitting the control signal.

* * * * *